(12) United States Patent
Kochersperger et al.

(10) Patent No.: US 7,549,321 B2
(45) Date of Patent: Jun. 23, 2009

(54) PRESSURE SENSOR

(75) Inventors: Peter C. Kochersperger, Easton, CT (US); Joseph H. Lyons, Wilton, CT (US); James Walsh, Newtown, CT (US); Rajan Mali, Shelton, CT (US)

(73) Assignee: ASML Holding N.V., Veldhoven (NL)

( * ) Notice: Subject to any disclaimer, the term of this patent is extended or adjusted under 35 U.S.C. 154(b) by 33 days.

(21) Appl. No.: 11/646,612

(22) Filed: Dec. 28, 2006

(65) Prior Publication Data
US 2007/0186621 A1  Aug. 16, 2007

Related U.S. Application Data

(63) Continuation-in-part of application No. 11/320,474, filed on Dec. 29, 2005, now abandoned.

(51) Int. Cl.
G01B 13/08 (2006.01)
G01B 13/22 (2006.01)

(52) U.S. Cl. .................................... 73/37.5
(58) Field of Classification Search ............ 73/37.5
See application file for complete search history.

(56) References Cited

U.S. PATENT DOCUMENTS

| | | | |
|---|---|---|---|
| 2,571,557 | A | 10/1951 | Fortier |
| 2,986,924 | A | 6/1961 | Becker |
| 3,026,714 | A | 3/1962 | Evans et al. |
| 3,210,987 | A | 10/1965 | Bruns |
| 3,433,408 | A | 3/1969 | Bellman et al. |
| 3,482,433 | A | 12/1969 | Gladwyn |
| 3,754,433 | A * | 8/1973 | Hyer .......................... 73/37.6 |
| 3,792,609 | A | 2/1974 | Blair et al. |
| 4,041,584 | A | 8/1977 | Williamson |

(Continued)

FOREIGN PATENT DOCUMENTS

GB  1 399 397  7/1975

(Continued)

OTHER PUBLICATIONS

Burrows, V.R., "The Principles and Applications of Pneumatic Gauging," FWP Journal, Oct. 1976, pp. 31-42.

(Continued)

*Primary Examiner*—Daniel S Larkin
(74) *Attorney, Agent, or Firm*—Sterne, Kessler, Goldstein & Fox P.L.L.C.

(57) ABSTRACT

A choked-flow orifice gas gauge proximity sensor for sensing a difference between a reference surface standoff and a measurement surface standoff is disclosed. Unlike existing proximity sensors, the gas gauge proximity sensor of the present invention replaces the use of a mass flow controller with a choked flow orifice. The use of a choked flow orifice provides for reduced equipment cost and improved system reliability. A gas supply forces gas into the proximity sensor. The gas is forced through the choked flow orifice to achieve sonic conditions at which time the mass flow rate becomes largely independent of pressure variations. The flow of gas proceeds from the choked flow orifice into a sensor channel system. A mass flow sensor within the sensor channel system monitors flow rates to detect measurement standoffs that can be used to initiate a control action.

17 Claims, 5 Drawing Sheets

U.S. PATENT DOCUMENTS

| | | |
|---|---|---|
| 4,187,715 A | 2/1980 | Nevitt |
| 4,550,592 A | 11/1985 | Dechape |
| 4,583,917 A | 4/1986 | Shah |
| 4,953,388 A | 9/1990 | Barada |
| 5,181,532 A | 1/1993 | Brodfors et al. |
| 5,184,503 A | 2/1993 | Hancock |
| 5,317,898 A | 6/1994 | Nemeth |
| 5,386,716 A * | 2/1995 | Thurston et al. ............. 73/37.5 |
| 5,540,082 A | 7/1996 | Okuyama et al. |
| 5,789,661 A | 8/1998 | Fauqué et al. |
| 6,152,162 A | 11/2000 | Balazy et al. |
| 6,978,658 B1 | 12/2005 | Kochersperger |
| 7,010,958 B2 | 3/2006 | Gajdeczko et al. |
| 7,017,390 B1 | 3/2006 | Vogel |
| 7,021,119 B2 | 4/2006 | Violette |
| 7,021,120 B2 | 4/2006 | Carter et al. |
| 7,021,121 B2 | 4/2006 | Ebert et al. |
| 7,124,624 B2 | 10/2006 | Gajdeczko et al. |
| 7,134,321 B2 | 11/2006 | Galburt et al. |
| 2004/0118183 A1 | 6/2004 | Gajdeczko et al. |
| 2005/0044963 A1 | 3/2005 | Lyons |
| 2007/0151327 A1 | 7/2007 | Kochersperger |

FOREIGN PATENT DOCUMENTS

| | | |
|---|---|---|
| JP | 57-191507 | 11/1982 |

OTHER PUBLICATIONS

Derwent Abstract Accession No. 86-324714/49, SU 1225634 A (Kiev Autom Inst) Apr. 23, 1986.

O'Keefe Control Co., "Choked Flow of Gases Tutorial," 2000, pp. 16-18 and 38.

* cited by examiner

PRESSURE SENSOR

This application is a continuation-in-part of U.S. application Ser. No. 11/320,474, filed Dec. 29, 2005, now abandoned, which is incorporated by reference herein in its entirety.

BACKGROUND

1. Field of the Invention

The present invention relates to a pressure sensor, comprising a gas supply, and a sensor channel system arranged to be supplied with a gas by the gas supply and arranged to vent the gas via one or more openings comprising at least one measurement opening, and the sensor channel system being arranged to perform a measurement indicative of the pressure at the at least one measurement opening.

2. Background Information

Many automated manufacturing processes require the sensing of the distance between a manufacturing tool and the product or material surface being worked. In some situations, such as semiconductor lithography, the distance must be measured with accuracy approaching a nanometer.

The challenges associated with creating a proximity sensor of such accuracy are significant, particularly in the context of photolithography systems. In the photolithography context, in addition to being non-intrusive and having the ability to precisely detect very small distances, the proximity sensor can not introduce contaminants or come in contact with the work surface, typically a semiconductor wafer. Occurrence of either situation may significantly degrade or ruin the semiconductor quality.

Different types of proximity sensors are available to measure very small distances. Examples of proximity sensors include capacitance and optical gauges. These proximity sensors have serious shortcomings when used in lithographic projection systems because physical properties of materials deposited on wafers may impact the precision of these devices. For example, capacitance gauges, being dependent on the concentration of electric charges, can yield spurious proximity readings in locations where one type of material (e.g., metal) is concentrated. Another class of problems occurs when exotic wafers made of non-conductive and/or photosensitive materials, such as Gallium Arsenide (GaAs) and Indium Phosphide (InP), are used. In these cases, capacitance and optical gauges may provide spurious results.

U.S. Pat. No. 4,953,388, entitled Air Gauge Sensor, issued Sep. 4, 1990 to Andrew Barada ("'388 Patent"), and U.S. Pat. No. 4,550,592, entitled Pneumatic Gauging Circuit, issued Nov. 5, 1985 to Michel Deschape ("'592 Patent"), disclose an alternative approach to proximity sensing that uses an air gauge sensor. The '388 and '592 patents are incorporated by reference herein in their entireties. These sensors use a sensor channel system comprising a reference and measurement nozzles to emit an air flow onto reference and measurement surfaces and measure back pressure differences within the sensors to determine the distance between the measurement nozzle and the measurement surface.

Furthermore, principles of pneumatic gauging are discussed in Burrows, V. R., The Principles and Applications of Pneumatic Gauging, FWP Journal, October 1976, pp. 31-42, which is incorporated by reference herein in its entirety. An air gauge sensor is not vulnerable to concentrations of electric charges or electrical, optical and other physical properties of a wafer surface. Current semiconductor manufacturing, however, requires that proximity is gauged with high precision on the order of nanometers. Earlier versions of air gauge sensors, however, often do not meet today's requirements for precision in lithographic projection apparatuses.

One improvement that has been made to improve the precision of air gauge sensors is to ensure a stable flow from a gas supply by using a mass flow controller and a gas pressure regulator at the input to the mass flow controller. The mass flow controller dissipates heat and is mounted remotely from the sensor channel system with a supply tube between the mass flow controller and the air gauge sensor. However, the supply tube represents volume. The larger the volume of the supply tube, the slower the response of the air gauge sensor. Because of the dissipation of heat, the mass flow controller is usually placed in a cabinet far away from the wafer stage compartment of the lithographic projection apparatus. The wafer stage compartment is a compartment of the lithographic projection apparatus wherein wafers are illuminated with a patterned beam of radiation while being supported by a wafer stage.

Also, the mass flow from the mass flow controller depends on the pressure of the air on the output side of the mass flow controller. The pressure of the air on the output side depends on the pressure at the measurement opening, so that the accuracy of the air gauge sensor is impaired. To overcome this, an accumulator is positioned at the output side of the mass flow controller to stabilize the pressure at the output side of the mass flow controller. However, this further increases the volume and decreases the response of the air gauge sensor.

Therefore, what is need is a system and method to provide a pressure sensor with increased positioning possibilities.

SUMMARY

In one embodiment of the present invention, there is provided a pressure sensor comprising a gas supply, a sensor channel system, and a restrictor. The sensor channel system is arranged to be supplied with a gas by the gas supply and arranged to vent the gas via one or more openings comprising at least one measurement opening. The sensor channel system is arranged to perform a measurement indicative of the pressure at the at least one measurement opening. The restrictor is positioned upstream of the sensor channel system and arranged to receive the gas from the gas supply. The gas supply and the restrictor are arranged to obtain a choked flow condition for gas flowing into the sensor channel system.

In one example, since the gas supply and the restrictor are arranged to obtain a choked flow condition, the mass flow rate through the restrictor is controlled and independent of gas pressure variations downstream of where the choked flow condition is met. This choked flow condition is met at the restrictor. The gas supplied into the sensor channel system is controlled, because the restrictor is upstream of the sensor channel system. This means the mass flow controller may not be needed anymore. The accumulator to stabilize the pressure at the output of the mass flow controller may also not be needed anymore. The restrictor does not dissipate heat, so that the restrictor can be placed with great freedom. In other words, this provides increased positioning possibilities to the pressure sensor.

Further embodiments, features, and advantages of the invention, as well as the structure and operation of the various embodiments of the invention are described in detail below with reference to accompanying drawings.

BRIEF DESCRIPTION OF THE FIGURES

Embodiments of the present invention are described with reference to the accompanying drawings. In the drawings, like reference numbers indicate identical or functionally similar elements.

DETAILED DESCRIPTION

Figure 1:
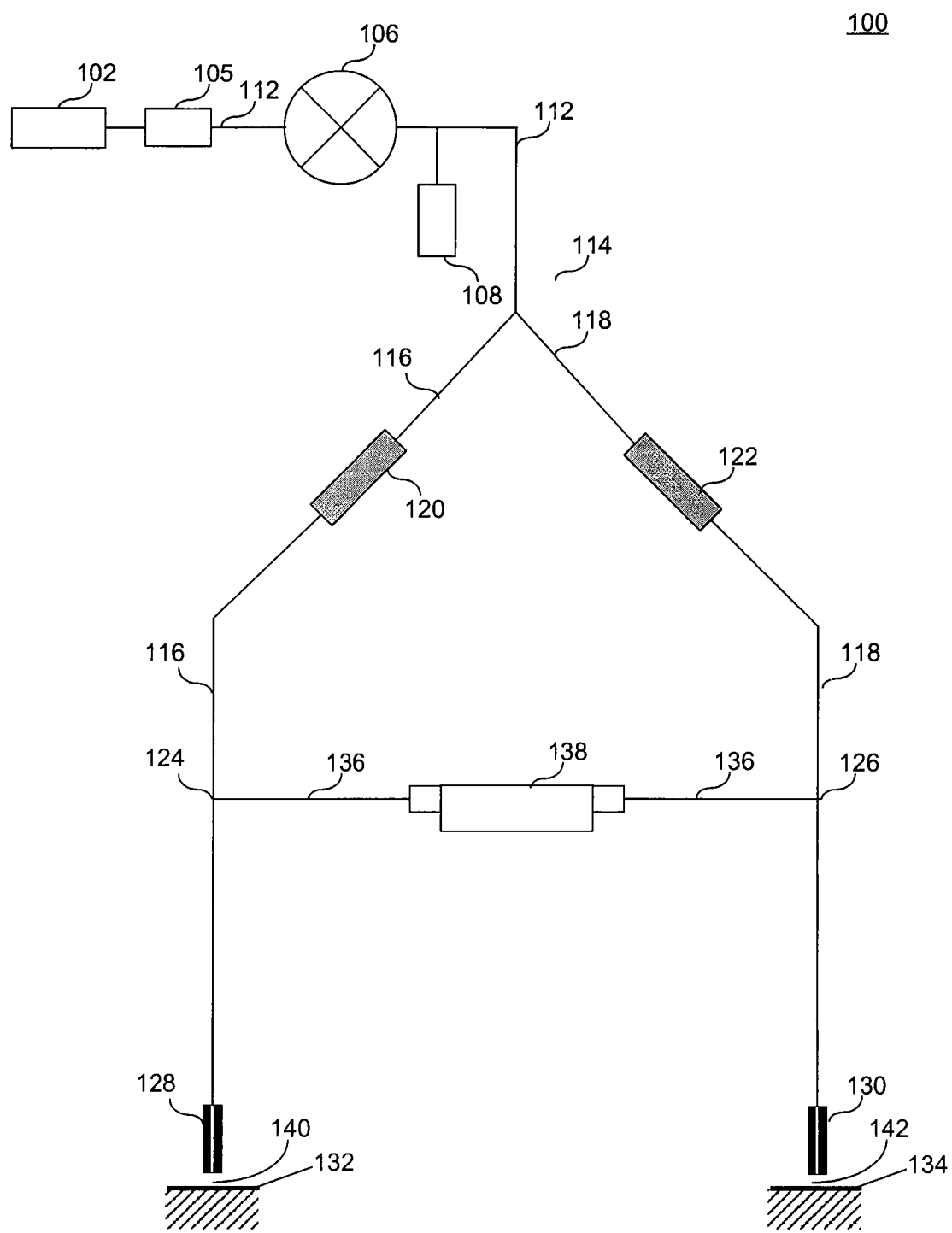
FIG. 1 is a diagram of a proximity sensor.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Co-pending, commonly owned U.S. patent application Ser. No. 10/322,768, entitled High Resolution Gas Gauge Proximity Sensor, filed Dec. 19, 2002 by Gajdeczko et al. (now U.S. Pat. No. 7,010,958), ("the '958 Patent") describes a high precision gas gauge proximity sensor that overcomes some of the precision limitations of earlier air gauge proximity sensors. The precision limitations are overcome by the introduction of porous snubbers to reduce turbulence in the flow of gases and thereby increase precision. The '958 Patent, which is incorporated by reference by reference herein in its entirety, describes a gas gauge proximity sensor that provides a high degree of accuracy.

Co-pending, commonly owned U.S. patent application Ser. No. 10/646,720, entitled High Resolution Gas Gauge Proximity Sensor, filed Aug. 25, 2003, by Joseph Lyons, ("the '720 patent application"), describes a proximity sensor in which a specialized nozzle is used to further increase precision and eliminate areas of insensitivity on a measurement surface during measurement operation. The '720 patent application is incorporated by reference herein in its entirety.

External acoustical interference can also impact gas gauge proximity sensors. Co-pending, commonly owned U.S. patent application Ser. No. 10/854,429 entitled Gas Gauge Proximity Sensor with a Modulated Gas Flow, filed May 27, 2004, by Ebert et al. (now U.S. Pat. No. 7,021,121), ("the '121 Patent") describes a gas gauge proximity sensor that modulates a gas stream at a modulated frequency in which there is minimal acoustical interference energy, thereby improving measurement precision. The '121 Patent is incorporated by reference herein in its entirety.

While the sensors disclosed in the '958 and '121 patents and '720 patent application provide a high degree of precision, the precision can be impacted by changes in local environmental conditions near measurement and reference nozzles. In one circumstance, even though the nozzles are often very close together, minor differences in environmental conditions can impact sensor accuracy. Co-pending, commonly owned U.S. patent application Ser. No. 10/833,249 entitled High Resolution Gas Gauge Proximity Sensor, filed Apr. 28, 2004, by Carter et al. (now U.S. Pat. No. 7,021,120), ("the '120 Patent") describes a gas gauge proximity sensor that includes a chamber that reduces environmental differences across measurement and references nozzles. The '120 Patent is incorporated by reference herein in its entirety.

A similar problem relates to cross flows of gas or liquid that intersect the stream of gas or liquid that is being emitted from a measurement channel of the proximity sensor. Specifically, purging gases, for example, can exhibit local cross winds with velocities of the order of a few meters per second. Crosswinds or cross-flows will cause gauge instability and drift, introducing non-calibratable errors within proximity sensors. Co-Pending, commonly owned U.S. patent application Ser. No. 11/005,246, entitled Proximity Sensor Nozzle Shroud with Flow Curtain, filed Dec. 7, 2004, by Herman Vogel (now U.S. Pat. No. 7,017,390), ("the '390 Patent") describes a proximity sensor that includes a shroud around the nozzles to reduce the impact on cross winds. The '390 Patent is incorporated by reference herein in its entirety.

Proximity sensors must be non-intrusive. Contact between a proximity sensor and a work surface can significantly degrade or ruin the semiconductor quality of quality of other work surface. However, to ensure the greatest level of precision often the measurement nozzle must be extremely close to the work surface. In certain circumstances, as higher levels of precision are required, the movement of a wafer stage or other work platform is such that it is desirable to move a proximity sensor toward and away from a work surface. This leads to another source of imprecision related to the mechanical stability of a proximity sensor head, when it is moved up and down. When the sensor head is extended, it can drift thereby reducing the accuracy of the proximity sensor. Co-pending, commonly owned, U.S. patent application Ser. No. 11/015, 652 entitled Proximity Sensor with Self Compensation for Mechanism Instability, filed Dec. 20, 2004, by Peter Kochersperger (now U.S. Pat. No. 6,978,658), ("the '658 Patent ") discloses a retractable proximity sensor that includes a self compensating mechanism to reduce the impact of proximity sensor head drift on the accuracy of the proximity sensor. The '658 Patent is incorporated by reference herein in its entirety.

FIG. 1 provides a diagram of gas gauge proximity sensor 100. Gas gauge proximity sensor 100 is one type of proximity sensor that can be improved through use of the present invention, and is not intended to limit the scope of the invention. Gas gauge proximity sensor 100 includes gas pressure regulator 105, mass flow controller 106, central channel 112, measurement channel 116, reference channel 118, measurement channel restrictor 120, reference channel restrictor 122, measurement probe 128, reference probe 130, bridge channel 136 and mass flow sensor 138. Gas supply 102 injects gas at a desired pressure into gas gauge proximity sensor 100.

Central channel 112 connects gas supply 102 to gas pressure regulator 105 and mass flow controller 106 and then terminates at junction 114. Gas pressure regulator 105 and mass flow controller 106 maintain a constant flow rate within gas gauge proximity sensor 100.

Gas is forced out from mass flow controller 106 into channel 112 with an accumulator 108 affixed to channel 112. The accumulator is affixed to channel 112 in order to stabilize the gas pressure at the output of the mass flow controller. This is because the mass flow controller output is dependent of the gas pressure at the output. In some situations, a snubber, which is not shown in the diagram, can be placed between mass flow controller 106 and junction 114. A snubber reduces gas turbulence introduced by the gas supply 102. A more complete description of snubber 110 can be found in the '120 Patent. Upon exiting mass flow controller 106, gas travels through central channel 112 to junction 114. Central channel 112 terminates at junction 114 and divides into measurement channel 116 and reference channel 118. Mass flow controller 106 injects gas at a sufficiently low rate to provide laminar and incompressible fluid flow throughout the system to minimize the production of undesired pneumatic noise. Likewise, the system geometry can be appropriately sized to maintain the laminar flow characteristics established by mass flow controller 106.

Mass flow controllers, such as mass flow controller 106, are expensive and often cost over a few thousand dollars especially when they are specified to be less dependent on pressure variations at the output. Mass flow controller 106 dissipates heat and is mounted remotely from the other components of gas gauge proximity sensor 100. Pliable supply tubes couple mass flow controller 106 to junction 114. The supply tube is subject to leaks. Although the leaks are often very small and would not normally affect other types of systems, they can have a significant impact on gas gauge proximity sensor performance. Furthermore, the volume of the tube acts like a capacitor. Local pressure changes around the gas gauge proximity sensor cause the flow through it to change and several seconds are required for the flow to stabilize because of the capacitive function of the volume of the tube. This effect is even increased when an accumulator is added to stabilize the gas pressure at the output of the mass flow controller.

Bridge channel 136 is coupled between measurement channel 116 and reference channel 118. Bridge channel 136 connects to measurement channel 116 at junction 124. Bridge channel 136 connects to reference channel 118 at junction 126. In one example, the distance between junction 114 and junction 124 and the distance between junction 114 and junction 126 are equal.

All channels within gas gauge proximity sensor 100 permit gas to flow through them. Channels 112, 116, 118, and 136 can be made up of conduits (tubes, pipes, etc.) or any other type of structure that can contain and guide gas flow through sensor 100. It is preferred that the channels do not have sharp bends, irregularities or unnecessary obstructions that may introduce pneumatic noise, for example, by producing local turbulence or flow instability. The overall lengths of measurement channel 116 and reference channel 118 can be equal or in other examples can be unequal.

Reference channel 118 terminates into reference nozzle 130. Likewise, measurement channel 116 terminates into measurement nozzle 128. Reference nozzle 130 is positioned above reference surface 134. Measurement nozzle 128 is positioned above measurement surface 132. In the context of photolithography, measurement surface 132 is often a semiconductor wafer, stage supporting a wafer, flat panel display, a print head, a micro- or nanofluidic device or the like. Reference surface 134 can be a flat metal plate, but is not limited to this example. Gas injected by gas supply 102 is emitted from each of the nozzles 128, 130 and impinges upon measurement surface 132 and reference surface 134. As stated above, the distance between a nozzle and a corresponding measurement or reference surface is referred to as a standoff.

Measurement channel restrictor 120 and reference channel restrictor 122 serve to reduce turbulence within the channels and act as a resistive element. In other embodiments, other types of resistive elements, such as, orifices can be used. However, orifices will not reduce turbulence.

Reference nozzle 130 is positioned above a fixed reference surface 134 with a known reference standoff 142. Measurement nozzle 128 is positioned above measurement surface 132 with an unknown measurement standoff 140. The known reference standoff 142 is set to a desired constant value representing an optimum standoff. With such an arrangement, the backpressure upstream of the measurement nozzle 128 is a function of the unknown measurement standoff 140; and the backpressure upstream of the reference nozzle 130 is a function of the known reference standoff 142. If standoffs 140 and 142 are equal, the configuration is symmetrical and the bridge is balanced. Consequently, there is no gas flow through bridging channel 136. On the other hand, when the measurement standoff 140 and reference standoff 142 are different, the resulting pressure difference between the measurement channel 116 and the reference channel 118 induces a flow of gas through mass flow sensor 138.

Mass flow sensor 138 is located along bridge channel 136, preferably at a central location. Mass flow sensor 138 senses gas flows induced by pressure differences between measurement channel 116 and reference channel 118. These pressure differences occur as a result of changes in the vertical positioning of measurement surface 132. For a symmetric bridge, when measurement standoff 140 and reference standoff 142 are equal, the standoff is the same for both of the nozzles 128, 130 compared to surfaces 132, 134. Mass flow sensor 138 will detect no mass flow, since there will be no pressure difference between the measurement and reference channels. Differences between measurement standoff 140 and reference standoff 142 will lead to different pressures in measurement channel 116 and reference channel 118. Proper offsets can be introduced for an asymmetric arrangement.

Mass flow sensor 138 senses gas flow induced by a pressure difference or imbalance. A pressure difference causes a gas flow, the rate of which is a unique function of the measurement standoff 140. In other words, assuming a constant flow rate into gas gauge 100, the difference between gas pressures in the measurement channel 116 and the reference channel 118 is a function of the difference between the magnitudes of standoffs 140 and 142. If reference standoff 142 is set to a known standoff, the difference between gas pressures in the measurement channel 116 and the reference channel 118 is a function of the size of measurement standoff 140 (that is, the unknown standoff between measurement surface 132 and measurement nozzle 128).

Mass flow sensor 138 detects gas flow in either direction through bridge channel 136. Because of the bridge configuration, gas flow occurs through bridge channel 136 only when pressure differences between channels 116, 118 occur. When a pressure imbalance exists, mass flow sensor 138 detects a resulting gas flow, and can initiate an appropriate control function. Mass flow sensor 138 can provide an indication of a sensed flow through a visual display, audio indication, computer controlled system or other signaling means. Alternatively, in place of a mass flow sensor, a differential pressure sensor may be used. The differential pressure sensor measures the difference in pressure between the two channels, which is a function of the difference between the measurement and reference standoffs.

Proximity sensor 100 is provided as one example of a device with a nozzle that can benefit from the present invention. The invention is not intended to be limited to use with only proximity sensor 100. Rather the invention can be used to improve other types of proximity sensors, such as, for example, the proximity sensors disclosed in the '388, '592, '958, '121, '120, '390 and '658 Patents, and the '720 patent application.

Figure 2:
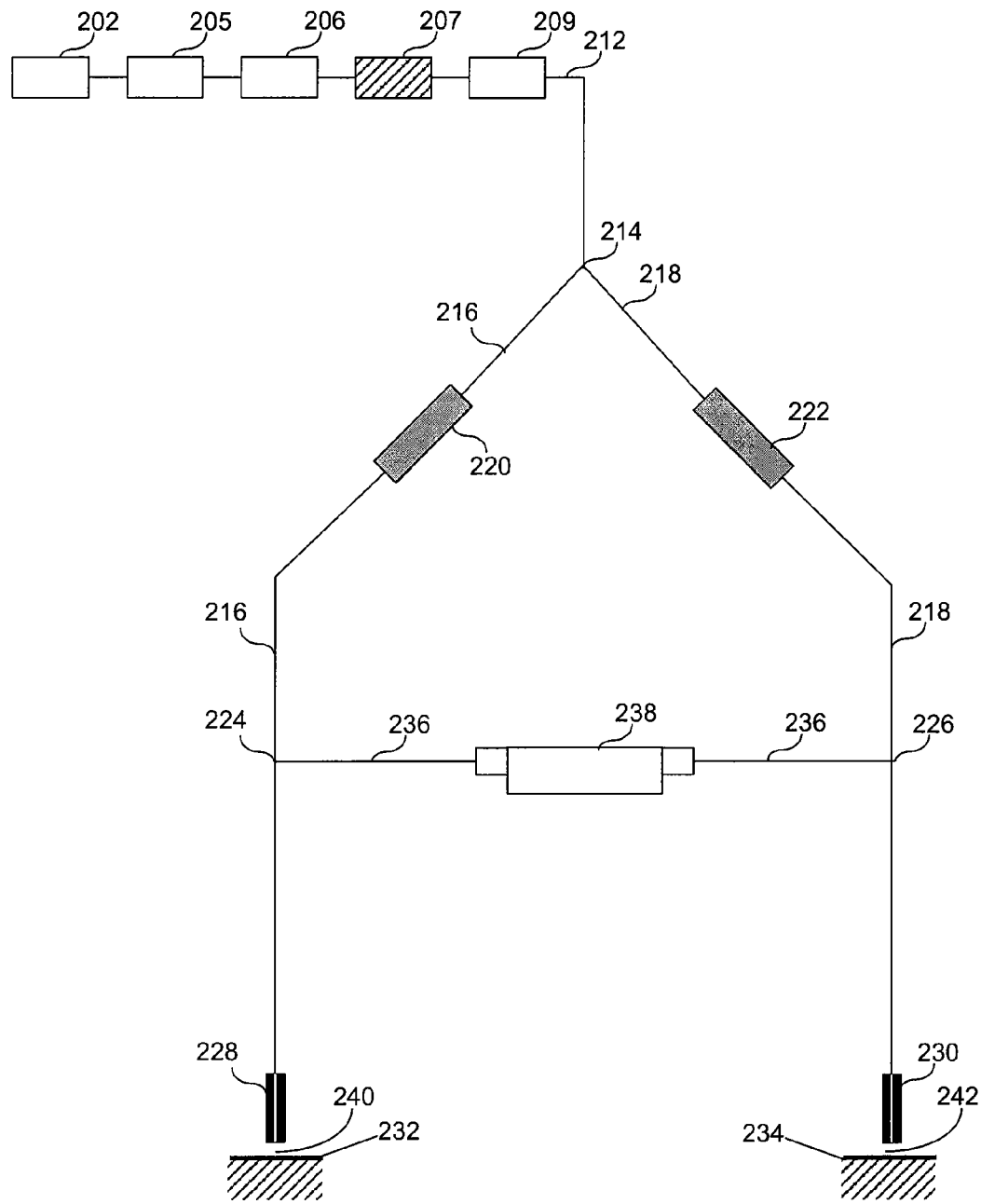
FIG. 2 is a diagram of a gas proximity sensor with a choke flow orifice, according to an embodiment of the invention.

FIG. 2 is a diagram of proximity sensor 200, according to an embodiment of the invention. A difference between proximity sensor 200 and proximity sensor 100 is the replacement of mass flow controller 106 with a choked flow orifice 207 receiving the gas from a gas supply 202 and upstream of a sensor channel system, which will be discussed in more detail below. The gas supply comprises a gas pressure regulator 205 supplying gas with a controlled pressure into the choked flow orifice 207. The sensor channel system comprises a measurement channel 216, a reference channel 218, a measurement channel restrictor 220, a reference channel restrictor 222, a measurement probe 228, a reference probe 230, a bridge channel 236 and a mass flow sensor 238. The measurement channel 216 and the reference channel 218 are coupled at a junction 214.

Central channel 212 connects gas supply 202 to gas pressure regulator 205 and choked flow orifice 207 and then terminates at junction 214. Gas pressure regulator 205 and choked flow orifice 207 maintain a constant mass flow rate within gas gauge proximity sensor 200, as is explained below. Gas is forced out from choked flow orifice 207 into channel 212. In some situations, a snubber 209 can be placed between choked flow orifice 207 and junction 214. Upon exiting choked flow orifice 207, gas travels through central channel 212 to junction 214.

Figure 3:
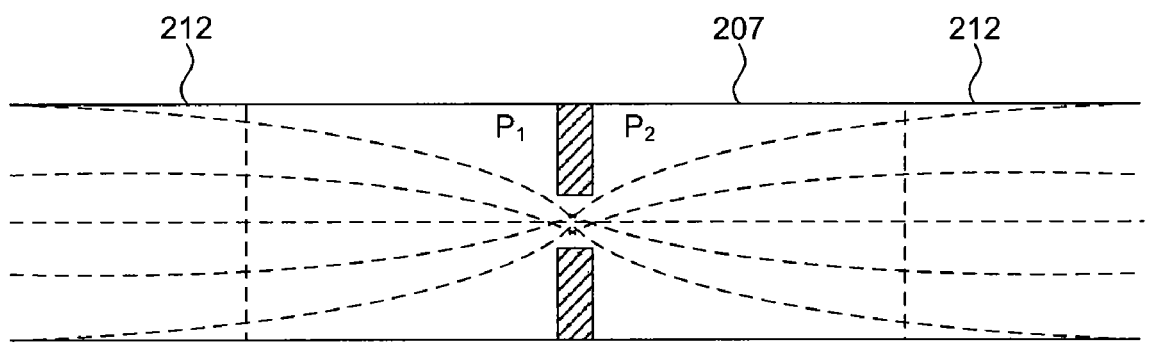
FIG. 3 is a diagram of a choke flow orifice.

The choked flow condition is reached in a gas when the gas traveling through the choked flow orifice increases to the speed of sound. In the gas flow through the choked flow orifice shown in FIG. 3 sonic conditions exist when the ratio of the downstream pressure, P2, to the upstream pressure, P1, is less than or equal to about 0.528. When sonic conditions exist, the gas velocity exiting choked flow orifice 207 is such that the velocity remains constant for all pressure ratios less than about 0.528. As a result, the use of the choked flow orifice 207 isolates minor drops in pressure that may occur from a small leak and provides a steady flow of gas through the channel structure of the pressure sensor.

The velocity in the orifice is independent of pressure variations at chocked flow conditions. Additionally, at choked flow, the mass flow through choked flow orifice 207 becomes independent of pressure differences downstream of the choked flow orifice. The mass flow is, therefore, also independent of pressure variations simultaneously present at both the measurement probe 228 and reference probe 230, so called common mode pressure variations. The choked flow conditions are ensured by estimating the worst case common mode pressure variations and supply the gas to the choked flow orifice with a pressure that is sufficiently high. The worst case common mode pressure variation corresponds to a maximum expected gas pressure directly downstream of the restrictor. This determines the threshold value of the pressure of the gas to be supplied to the choked flow orifice. As is described below, in an embodiment of the present invention a gas pressure regulator is used to supply gas to the choked flow orifice with a regulated pressure which is, for example, a constant pressure above the threshold value.

In case the proximity sensor 200 is placed in a lithographic apparatus to detect a proximity of a wafer, common mode pressure variations may frequently be present. For instance, they may be caused by pressure changes of a clean room in which the lithographic apparatus is placed. Such pressure changes can occur because such a clean room is kept on a higher pressure than its surroundings. This is to make sure dust does not flow into to clean room. Whenever a door is opened, to allow an operator entrance to the clean room, the pressure will drop. Also, the lithographic apparatus comprises parts that move at high velocities, such as a wafer table. The wafer table is a device that supports a wafer when the wafer is measured and when the wafer is illuminated. The wafer table creates a bow wave when moving at high speeds, and the bow wave corresponds to pressure changes.

Sensitivity to common mode pressure variations is unwanted, as such sensitivity implies less accurate measurements. The accuracy of measurements of the proximity sensor depends on the stability of the mass flow through the reference channel 218. This is because the mass flow sensor 238 is calibrated to give pressure differences as a function of the mass flow through the mass flow sensor 238 for a fixed mass flow through the reference channel 218. When there is a mass flow through the bridge channel 236 and the mass flows through measurement channel 216 and reference channel 218 both change because of common mode pressure variations (with equal pressure difference), the mass flow sensor 238 will detect a change in the mass flow through the bridge channel 236. Mass flow sensor 238 may misinterpret the change in mass flow through bridge channel 236 to be caused by a higher pressure difference between measurement probe 238 and reference probe 230 at constant air flow through both the measurement channel 216 and the reference channel 218. Mass flow sensor 238 may then give a less accurate reading. The mass flow through the bridge channel can change because the pressure profile from junction 226 to reference nozzle 230 is not linear and the pressure profile from junction 224 to measurement nozzle 228 is not linear.

In one example, since the choked flow orifice comprised by the pressure sensor of the present invention does not dissipate heat as the mass flow controller 106 of pressure sensor 100 does, it need not be positioned far away from the junction 214. A use of this will be explained below.

In a lithographic apparatus a wafer is exposed to a beam of radiation at an exposure station. Beforehand, several aspects of the wafer are measured at a measurement station. Such aspects can comprise the position of the wafer relative to a wafer stage supporting the wafer, the position of alignment marks on the wafer, and/or the thickness of the wafer. In a modem lithographic apparatus the exposure station and the measurement station are separated, in older lithographic apparatus they are one and the same.

In one embodiment the wafer (or another substrate) is supported by a substrate stage. The position of the substrate stage is continuously measured and controlled and varied by positioning means if necessary. The substrate stage comprises a table that actually supports the substrate on one side. The pressure sensor (gas gauge proximity sensor) may be used at the measurement station to measure the proximity of the wafer to the pressure sensor while scanning the wafer underneath the gas gauge proximity sensor and, as described above, keeping track of the position of the wafer. By comparing the position of the wafer stage, and thereby the wafer, with the proximity of the wafer to the gas gauge proximity sensor at multiple positions along the scan, a map of the wafer thickness is made. Predetermined information on the position of the pressure sensor relative to the substrate stage is used.

However, because the lithographic apparatus comprises many devices that are very accurate, but sensitive to temperature changes, a very high standard of temperature control may be applied. In one example, at the measurement station there are no devices allowed that dissipate an amount of heat that is above a threshold.

The mass flow controller of conventional proximity sensors is a device that is not allowed at the measurement station. Therefore, the mass flow controller is positioned away from the measurement station, for instance in a special temperature control cabinet. The heat dissipation in the temperature control cabinet is controlled separately, and therefore does not influence the performance of the rest of the machine. A long central channel 112 is used to guide the gas from the mass flow controller 106 to the measurement channel 116 and the reference channel 118. This distance may be several meters.

In the embodiment described above, since the choked flow orifice 207 comprised by the pressure sensor does not dissipate as much heat as the mass flow controller 106 does, it need not be positioned far away from the measurement opening 228 and the reference opening 230 (or the junction 214 or the measurement channel 216 and the reference channel 218).

Additionally, or alternatively, by having this freedom to position the choked flow orifice 207, the volume between the choked flow orifice and the measurement probe 228 and the reference probe 230 are chosen to be as small as possible. This is because the larger the volume, the lower the frequency response of the proximity sensor 200. The volume between choked flow orifice 207 and restrictors 220 and 222 is part of the volume between the choked flow orifice and the measurement probe 228 and the reference probe 230.

In an embodiment, the choked flow orifice, which is a restrictor 207, is positioned close to an inlet of the sensor channel system (junction 214 and the parts of the pressure sensor downstream) or even at the inlet. Relative to the lithographic apparatus, a placement close to or at the inlet means that the restrictor 207 is in the substrate stage compartment, i.e., a compartment in a lithographic apparatus that is arranged to comprise at least one substrate stage for supporting the substrate while illuminating the substrate with a beam with a patterned cross section. The substrate stage compartment is an area in the lithographic apparatus that is typically under very close temperature control. This is because the compartment typically comprises interferometers that keep track of the position of the substrate stage. The interferometers are sensitive to temperature changes.

When the choked flow orifice is placed close to the inlet or at the inlet, the volume of the central channel 212 can be much smaller, i.e., several orders of magnitude smaller, than the volume of the central channel 112 of the pressure sensor 100. Therefore, the pressure sensor 200 responds to local pressure variations much faster than proximity sensor 100. Additionally, or alternatively, an accumulator, such as discussed for the proximity sensor 100, is not used in pressure sensor 200. Since such an accumulator only adds to the volume, thereby lowering the high frequency response, this proximity sensor 200 has a better high frequency response than the proximity sensor 100.

Between the gas supply 202 and the choked flow orifice 207 there is a gas pressure regulator 205 having an output (not shown) through which the gas pressurized gas is supplied to the choked flow orifice 207. The gas pressure regulator 205 supplies gas with a constant pressure at its output (not shown), independent of gas pressure of gas supplied by gas supply 202 to the gas pressure regulator 205. The gas pressure regulator 205 supplies gas with a constant pressure even if there are leaks between gas supply 202 and the gas pressure regulator 205. The choked flow orifice 207 has an input (not shown) receiving the gas supplied by the gas pressure regulator 205. The output of the gas pressure regulator 205 is coupled to the input of the choked flow orifice 207. Although the mass flow controlled by a choked flow condition depends on pressure variations upstream of the choked flow condition, the pressure sensor of this embodiment is not, because the pressure variations upstream of the choked flow condition are controlled by the gas pressure regulator 205.

In an alternative embodiment, which for instance may be used if the pressure of the gas supplied by the gas supply 202 is stable enough for the intended use of the pressure sensor, the gas is supplied to the choked flow orifice without the pressure sensor having a gas pressure regulator.

In another embodiment, the pressure sensor 200 comprises a temperature controller 206 arranged to control the temperature of the gas received by the restrictor (207). This is to further stabilize the mass flow downstream of the choked flow orifice 207, since the mass flow through the choked flow orifice 207 is slightly dependent on the temperature of the gas upstream of the choked flow orifice.

Choked flow orifices, such as choked flow orifice 207, are available from specialty controls companies. For example, O'Keefe Control Co. of Trumbull, Connecticut provides a sapphire orifice with integral wire screen that can be used.

Following the choked flow orifice 207, the architecture of the proximity sensor 200 is the same as that of proximity sensor 100, of course with the difference that the central channel 212 has a volume which is much smaller than the central channel 112. The portion of the architecture that follows choked flow orifice 207 can be referred to as the sensing channel system. The sensing channel system described below is an example of a sensing channel system that can be used with a gas supply and choked flow orifice to form a proximity sensor. Other sensing channel systems such as, for example, those disclosed in the '388, '592, '958, '121, '120, '390 and '658 Patents, and the '720 patent application can also be used. The remaining architecture of proximity sensor 200 is provided here for completeness.

Central channel 212 terminates at junction 214 and divides into measurement channel 216 and reference channel 218. Choked flow orifice 207 injects gas at a sufficiently low rate to provide laminar and incompressible fluid flow throughout the system to minimize the production of undesired pneumatic noise. Likewise, the system geometry can be appropriately sized to maintain the laminar flow characteristics established by choked flow orifice 207.

Bridge channel 236 is coupled between measurement channel 216 and reference channel 218. Bridge channel 236 connects to measurement channel 216 at junction 224. Bridge channel 236 connects to reference channel 218 at junction 226. In one example, the distance between junction 214 and junction 224 and the distance between junction 214 and junction 226 are equal. Channels 216 and 218 include channel restrictors 220 and 222 respectfully, which are described in detail below.

All channels within gas gauge proximity sensor 200 permit gas to flow through them. Channels 212, 216, 218, and 236 can be made up of conduits (tubes, pipes, etc.) or any other type of structure that can contain and guide gas flow through sensor 200. It is preferred that the channels do not have sharp bends, irregularities or unnecessary obstructions that may introduce pneumatic noise, for example, by producing local turbulence or flow instability. The overall lengths of measurement channel 216 and reference channel 218 can be equal or in other examples can be unequal.

Reference channel 218 terminates into reference nozzle 230. Likewise, measurement channel 216 terminates into measurement nozzle 228. Reference nozzle 230 is positioned above reference surface 234. Measurement nozzle 228 is positioned above measurement surface 232. In the context of photolithography, measurement surface 232 is often a semiconductor wafer, a stage supporting a wafer, a flat panel display, a print head, a micro- or nanofluidic device or the like. Reference surface 234 can be a flat metal plate, but is not limited to this example. Gas injected by gas supply 202 is emitted from each of the nozzles 228, 230 and impinges upon measurement surface 232 and reference surface 234. As stated above, the distance between a nozzle and a corresponding measurement or reference surface is referred to as a standoff.

Measurement channel restrictor 220 and reference channel restrictor 222 serve to reduce turbulence within the channels and act as a resistive element. In other embodiments, other types of resistive elements, such as, orifices can be used. Although orifices will not reduce turbulence.

In one embodiment, reference nozzle 230 is positioned above a fixed reference surface 234 with a known reference standoff 242. Measurement nozzle 228 is positioned above measurement surface 232 with an unknown measurement standoff 240. The known reference standoff 242 is set to a desired constant value representing an optimum standoff. With such an arrangement, the backpressure upstream of the measurement nozzle 228 is a function of the unknown measurement standoff 240; and the backpressure upstream of the reference nozzle 230 is a function of the known reference standoff 242. If standoffs 240 and 242 are equal, the configuration is symmetrical and the bridge is balanced. Consequently, there is no gas flow through bridging channel 236. On the other hand, when the measurement standoff 240 and reference standoff 242 are different, the resulting pressure difference between the measurement channel 216 and the reference channel 218 induces a flow of gas through mass flow sensor 238.

Mass flow sensor 238 is located along bridge channel 236, preferably at a central location. Mass flow sensor 238 senses gas flows induced by pressure differences between measurement channel 216 and reference channel 218. These pressure differences occur as a result of changes in the vertical positioning of measurement surface 232. For a symmetric bridge, when measurement standoff 240 and reference standoff 242 are equal, the standoff is the same for both of the nozzles 228, 230 compared to surfaces 232, 234. Mass flow sensor 238 will detect no mass flow, since there will be no pressure difference between the measurement and reference channels. Differences between measurement standoff 240 and reference standoff 242 will lead to different pressures in measurement channel 216 and reference channel 218. Proper offsets can be introduced for an asymmetric arrangement.

Mass flow sensor 238 senses gas flow induced by a pressure difference or imbalance. A pressure difference causes a gas flow, the rate of which is a unique function of the measurement standoff 240. In other words, assuming a constant flow rate into gas gauge 200, the difference between gas pressures in the measurement channel 216 and the reference channel 218 is a function of the difference between the magnitudes of standoffs 240 and 242. If reference standoff 242 is set to a known standoff, the difference between gas pressures in the measurement channel 216 and the reference channel 218 is a function of the size of measurement standoff 240 (that is, the unknown standoff between measurement surface 232 and measurement nozzle 228).

Mass flow sensor 238 detects gas flow in either direction through bridge channel 236. Because of the bridge configuration, gas flow occurs through bridge channel 236 only when pressure differences between channels 216, 218 occur. When a pressure imbalance exists, mass flow sensor 238 detects a resulting gas flow, and can initiate an appropriate control function. Mass flow sensor 238 can provide an indication of a sensed flow through a visual display or audio indication. Alternatively, in place of a mass flow sensor, a differential pressure sensor may be used. The differential pressure sensor measures the difference in pressure between the two channels, which is a function of the difference between the measurement and reference standoffs.

Proximity sensor 200 is provided as one example of a device with a nozzle that can benefit from the present invention. The invention is not intended to be limited to use with only proximity sensor 200. Rather the introduction of a choked flow orifice to replace a mass flow controller can be used to improve other types of proximity sensors, such as, for example, the proximity sensors disclosed in the '388, '592, '958, '121, '120, '390 and '658 Patents, and the '720 patent application.

Figure 4:
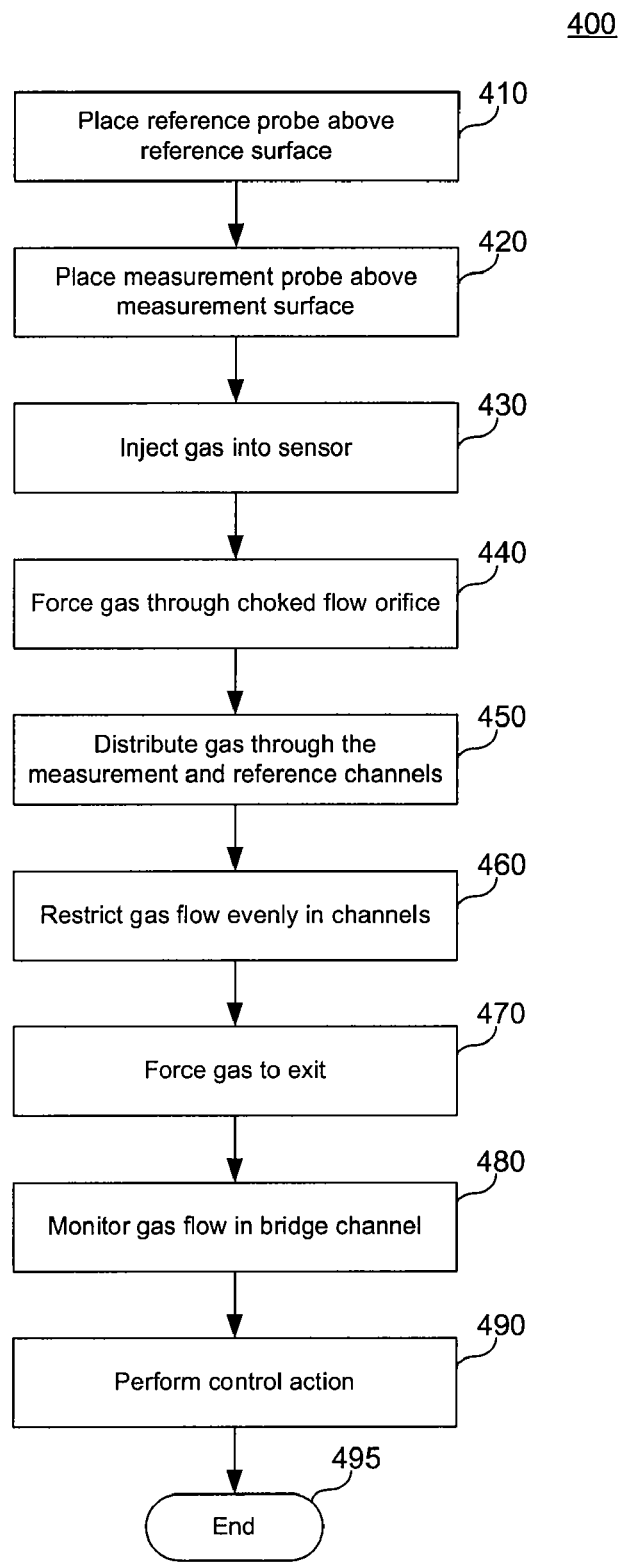
FIG. 4 is a flowchart of a method to detect very small distances using a choke flow orifice-based gas gauge proximity sensor, according to an embodiment of the invention.

FIG. 4 provides a flowchart of a method 400 for using gas flow to detect very small distances and perform a control action. For convenience, method 400 is described with respect to gas gauge proximity sensor 200. However, method 400 is not necessarily limited by the structure of sensor 200, and can be implemented with a sensor having a different structure.

The process begins in step 410. In step 410, an operator or mechanical device places a reference probe above a reference surface. For example, an operator or mechanical device positions reference probe 230 above reference surface 234 with known reference standoff 242. Alternatively, the reference standoff can be arranged within the sensor assembly, that is, internal to the sensor assembly. The reference standoff is pre-adjusted to a particular value, which typically would be maintained constant.

In step 420, an operator or mechanical device places a measurement probe above a measurement surface. For example, an operator or mechanical device positions measurement probe 228 above measurement surface 232 to form measurement gap 240.

In step 430, gas is injected into a sensor. For example, a measurement gas is injected into gas gauge proximity sensor 200 with a constant mass flow rate.

In step 440, gas is forced through a choked flow orifice. For example, gas can be forced through choke flow orifice 207 to achieve sonic conditions at which point the mass flow through the orifice becomes largely independent of pressure differences. A constant gas flow rate into a sensor is maintained. For example, choke flow orifice 207 maintains a constant gas flow rate.

In step 450, gas flow is distributed between measurement and reference channels. For example, gas gauge proximity sensor 200 causes the flow of the measurement gas to be evenly distributed between measurement channel 216 and reference channel 218.

In step 460, gas flow in the measurement channel and the reference channel is restricted evenly across cross-sectional areas of the channels. Measurement channel restrictor 220 and reference channel restrictor 222 restrict the flow of gas to reduce pneumatic noise and serve as a resistive element in gas gauge proximity sensor 200.

In step 470, gas is forced to exit from a reference and measurement probe. For example, gas gauge proximity sensor 200 forces gas to exit measurement probe 228 and reference probe 230. In step 480, a flow of gas is monitored through a bridge channel connecting the reference channel and the measurement channel. In step 490, a control action is performed based on a pressure difference between the reference and measurement channel. For example, mass flow sensor 238 monitors mass flow rate between measurement channel 216 and reference channel 218. Based on the mass flow rate, mass flow sensor 238 initiates a control action. Such control action may include providing an indication of the sensed mass flow, sending a message indicating a sensed mass flow, or initiating a servo control action to reposition the location of the measurement surface relative to the reference surface until no mass flow or a fixed reference value of mass flow is sensed. In step 495, method 400 ends.

While various embodiments of the present invention have been described above, it should be understood that they have been presented by way of example, and not limitation. It will be apparent to persons skilled in the relevant art that various changes in form and detail can be made therein without departing from the spirit and scope of the invention.

As discussed above, the pressure sensor may or may not comprise the gas pressure regulator 205. Also the pressure sensor may comprise a single or several measurement channels. For instance there may be one or more conduits 216 arranged to receive the gas from the restrictor 207 and to guide the gas from the restrictor to one or more bridge junctions 224 of the one or more conduits with the bridge 236 and comprising one or more further restrictive elements 220 upstream of the one or more bridge junctions. Additionally or alternatively, the pressure sensor may comprise several reference channels like reference channel 218. It may also lack a reference channel. The invention is not limited to the use of for instance air; in stead it also applies to gas pressure sensors.

Figure 5:
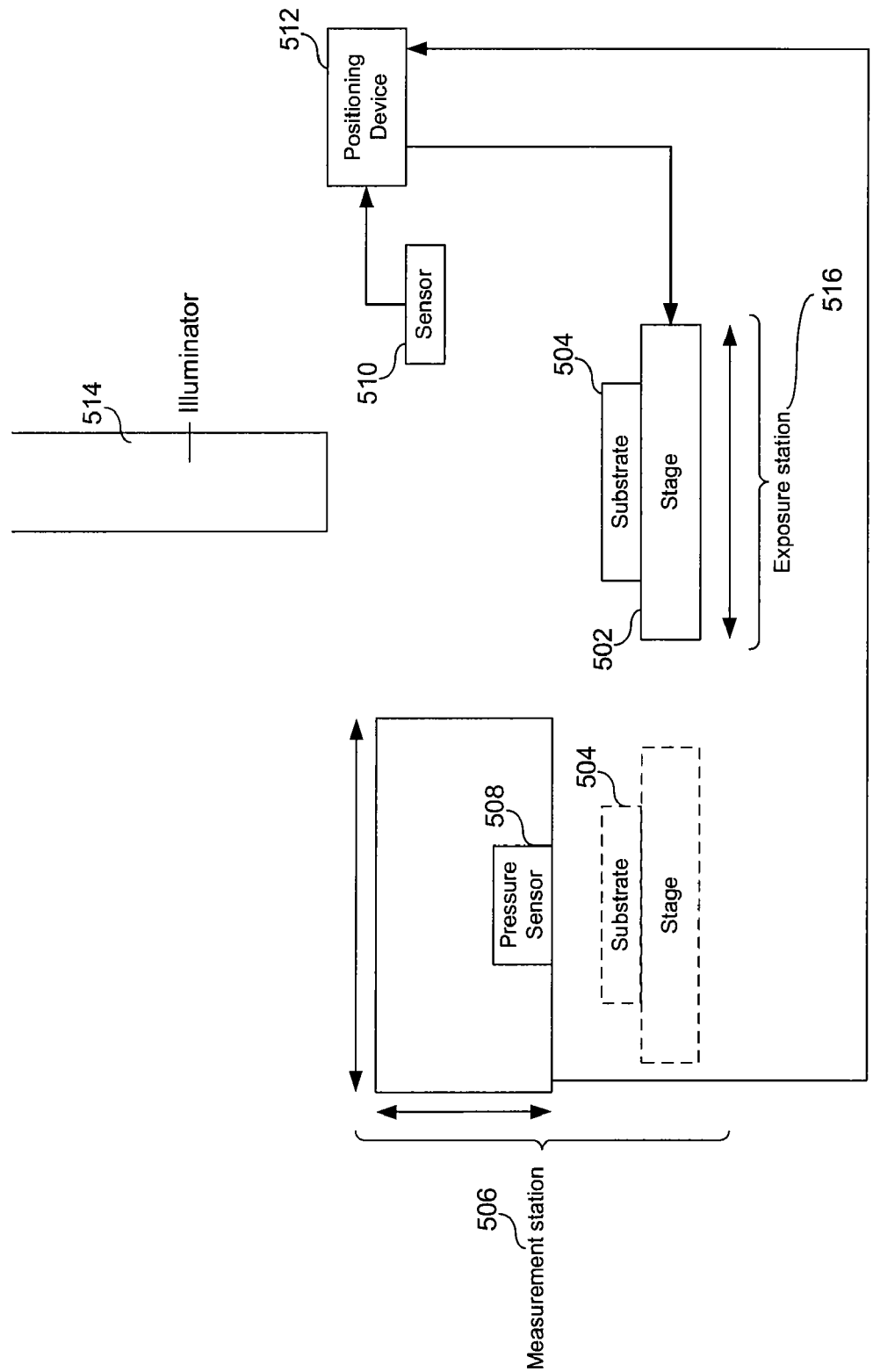
FIG. 5 shows a portion of a lithography system

FIG. 5 shows a portion 500 of a lithography system such as a lithographic projection apparatus. Portion 500 includes a stage 502, a substrate 504, a measurement station 506, a pressure sensor 508, a position sensor 510, a positioning device 512, and an exposure station 516. Substrate 504 (shown in phantom at measuring station 506) is measured using pressure sensor 508 before being received on stage 502. Alternative, substrate 504 can be measured while on stage 502 by either measuring station 506 or sensor 510. Signals from measuring station 506 and sensor 510 are received by positioned device 512 in order to control stage 502. An illuminator 514 illuminates patterned beam onto substrate 504 to pattern substrate 504 when substrate 504 is positioned at exposure station 516.

The present invention has been described above with the aid of method steps illustrating the performance of specified functions and relationships thereof. The boundaries of these method steps have been arbitrarily defined herein for the convenience of the description. Alternate boundaries can be defined so long as the specified functions and relationships thereof are appropriately performed. Any such alternate boundaries are thus within the scope and spirit of the claimed invention. Thus, the breadth and scope of the present invention should not be limited by any of the above-described exemplary embodiments, but should be defined only in accordance with the following claims and their equivalents.

The Detailed Description section should primarily be used to interpret the claims. The Summary and Abstract sections may set forth one or more, but not all, exemplary embodiments of the present invention as contemplated by the inventor(s), and thus, are not intended to limit claims.

What is claimed is:

1. A pressure sensor, comprising:
    a gas supply;
    a sensor channel system configured to be supplied with a gas from the gas supply and arranged to vent the gas via one or more openings comprising a measurement opening, and the sensor channel system being configured to perform a measurement indicative of a pressure at the measurement opening; and
    a restrictor located downstream of the gas supply and upstream of the sensor channel system and configured to receive the gas from the gas supply at a sufficient pressure to provide a choked flow condition such that mass flow through the restrictor is independent of pressure difference across the restrictor.

2. The pressure sensor of claim 1, wherein the restrictor comprises an orifice.

3. The pressure sensor of claim 1, wherein the restrictor is located before an inlet of the sensor channel system, the inlet being configured to receive the gas from the gas supply.

4. The pressure sensor of claim 3, wherein the restrictor is located at the inlet of the sensor channel system.

5. The pressure sensor of claim 1, wherein the gas supply and the restrictor are configured to maintain a ratio between gas pressure directly upstream of the restrictor and directly downstream of the restrictor substantially equal to or greater than a threshold value corresponding to a maximum expected gas pressure directly downstream of the restrictor by supplying the gas from the gas supply to the restrictor at the sufficient pressure.

6. The pressure sensor of claim 1, wherein:
    the one or more openings comprise a reference opening; and
    the sensor channel system is configured to perform a measurement indicative of a pressure difference between the measurement opening and the reference opening.

7. The pressure sensor of claim 6, wherein the sensor channel system comprises:
    a measurement branch comprising the measurement opening;
    a reference branch comprising the reference opening; and
    a bridge between the measurement branch and the reference branch, the bridge being configured to measure a pressure difference between the measurement opening and the reference opening upstream of the measurement opening and the reference opening.

8. The pressure sensor of claim 7, further comprising:
    a junction located upstream of the bridge, the junction being configured to be passed by the gas supplied via the restrictor to both the measurement branch and the reference branch.

9. The pressure sensor of claim 7, further comprising:
    a conduit configured to receive the gas from the restrictor and to guide the gas from the restrictor to a bridge junction, the bridge junction being configured to couple the conduit with the bridge; and
    a further restrictive element located upstream of the bridge junction.

10. The pressure sensor of claim 9, wherein the further restrictive element comprises a porous snubber.

11. The pressure sensor of claim 1, wherein the restrictor is located at an inlet of the sensor channel system, the inlet being configured to receive the gas from the gas supply.

12. A pressure sensor comprising:
    a gas supply;
    a sensor channel system configured to be supplied with a gas from the gas supply and arranged to vent the gas via one or more openings comprising a measurement opening, the sensor channel system being configured to perform a measurement indicative of a pressure at the measurement opening;
    a restrictor located upstream of the sensor channel system and configured to receive the gas from the gas supply at a sufficient pressure; and
    a pressure regulator configured to supply gas to the restrictor with a regulated pressure,
    wherein the gas supply and the restrictor are configured to obtain a choked flow condition for gas flowing into the sensor channel system.

13. A pressure sensor comprising:
    a gas supply;
    a sensor channel system configured to be supplied with a gas from the gas supply and arranged to vent the gas via one or more openings comprising a measurement opening, the sensor channel system being configured to perform a measurement indicative of a pressure at the measurement opening;

a restrictor located upstream of the sensor channel system and configured to receive the gas from the gas supply at a sufficient pressure; and a temperature controller configured to control a temperature of the gas received by the restrictor, wherein the gas supply and the restrictor are configured to obtain a choked flow condition for gas flowing into the sensor channel system.

14. A lithographic apparatus comprising:

a gas supply;

a sensor channel system configured to be supplied with a gas from the gas supply and arranged to vent the gas via one or more openings comprising a measurement opening, the sensor channel system being configured to perform a measurement indicative of a pressure at the measurement opening;

a restrictor located upstream of the sensor channel system and configured to receive the gas from the gas supply at a sufficient pressure; and an exposure station configured to expose a substrate to a beam of radiation comprising a pattern in its cross section, wherein the gas supply and the restrictor are configured to obtain a choked flow condition for gas flowing into the sensor channel system.

15. The lithographic apparatus of claim 14, further comprising:

a measurement station configured to measure one or more aspects of the substrate prior to exposing the substrate, wherein the sensor channel system and the restrictor are located at the measurement station.

16. The lithographic apparatus of claim 14, wherein the measurement opening and the substrate are positioned such that the gas vented from the measurement opening impinges on the substrate.

17. The lithographic apparatus of claim 14, further comprising:

a substrate stage compartment that is configured to comprise a substrate stage configured to support the substrate during illumination of the substrate with a beam with a patterned cross section, wherein the restrictor and the sensor channel system are located in the substrate stage compartment.

* * * * *